United States Patent [19]

Patterson

[11] Patent Number: 5,303,503
[45] Date of Patent: Apr. 19, 1994

[54] IRRIGATION AND FERTILIZATION SYSTEM

[76] Inventor: James A. Patterson, 2074 20th St., Sarasota, Fla. 34236

[21] Appl. No.: 141,819

[22] Filed: Oct. 22, 1993

Related U.S. Application Data

[63] Continuation-in-part of Ser. No. 843,539, Feb. 28, 1992, abandoned.

[51] Int. Cl.$^5$ .................. A01G 29/00; A01G 25/06; A01B 79/02
[52] U.S. Cl. .......................... 47/48.5; 47/79; 47/58; 47/DIG. 10; 47/81
[58] Field of Search ............ 47/48.5, 79, 58, DIG. 10, 47/81

[56] References Cited

U.S. PATENT DOCUMENTS

| | | | |
|---|---|---|---|
| 4,651,468 | 3/1987 | Martinez et al. | 47/80 |
| 4,805,343 | 2/1989 | Patterson et al. | 47/79 |
| 4,920,694 | 5/1990 | Higa | 47/58 |
| 4,928,427 | 5/1990 | Patterson | 47/58 |

Primary Examiner—Richard L. Raymond
Assistant Examiner—Deborah Lambkin
Attorney, Agent, or Firm—Charles J. Prescott

[57] ABSTRACT

A fertilization and irrigation system including a hollow tubular fiber conduit having a liquid permeable wall for nitrogen fertilizing and irrigating soil. The conduit or length of this tubular material is placed within the soil generally in the vicinity of the root level of plants to be irrigated. For nitrogen fertilization, ammonium hydroxide ($NH_4OH$) is introduced into the conduit, the ammonia ($NH_3$) then allowed to permeate through the conduit wall into the soil. The presence of ammonium hydroxide may be by circulation or held statically under a varying amount of static head pressure. The ammonium hydroxide interacts to dissolve plasticizer within the hollow fiber conduit so that the plasticizer will thereafter go into colloidal suspension within water and carried away. By removal of plasticizer in this manner, both fertilization efficiency and the water permeability of the conduit for subsequent irrigation of the plants and soil are increased significantly.

5 Claims, 1 Drawing Sheet

IRRIGATION AND FERTILIZATION SYSTEM

BACKGROUND OF THE INVENTION

This is a continuation-in-part application of Ser. No. 07/843,539 filed on Feb. 28, 1992.

This invention is generally related to irrigation and fertilization systems, and more particularly to a subterranean nitrogenation and irrigation system for introducing nitrogen and moisture into large fields of plants.

All green plants require nitrogen to accomplish two major growth processes, that of producing chlorophyll and that of producing proteins. Nitrogen is usually supplied to new plants by the decay of past plants giving up their chlorophyll nitrogen. However, where the plants are harvested, there is an insufficient source of nitrogen remaining to supply new plant growth.

Hence, an additional source of nitrogen for new plants must be introduced into the soil to optimize plant growth. To improve a crop yield, nitrogen is added through fertilization.

Natural nitrogen fertilization by the slow decay and release of ammonia is the most general type of fertilization, the breakdown of chlorophyll. The cycle of plant growth and decay produces this effect. However, as above indicated, the removal of mature plants from soil during harvesting breaks this nitrogen producing cycle.

One means of enriching the nitrogen content of soil is through mulching. Manures may also be added into the natural decay cycle as well as proteins such as fish meal nitrogen supply.

The growing of high nitrogen fixing plants in a field will also naturally supply this soil with depleted nitrogen or its natural sources. However, this planting technique is generally insufficient to meet the requirement of a subsequent massive agricultural planting.

To satisfy the nitrogen needs of agricultural producing fields, then, a farmer typically resorts to the application of synthesized nitrogen compounds. For example, anhydrous ammonia, hydrous ammonia, urea and urea suspensions, ammonia cation in salts, nitrate anion in salts such as ammonia nitrate are utilized.

Urea and a urea suspension must be drilled into the ground for optimal results of subterranean decay since a bacterial reaction is required to convert urea nitrogen to ammoniacal nitrogen. Spraying urea suspensions is ineffective as the surface conversion of urea to ammonia nitrogen is lost to the air.

The use of nitrites and nitrates, because they are very water soluble, require bacterial conversion to a plant-useable ammoniacal nitrogen form. Short soil retention in the plant root zone is typical and irrigation and rains wash these salts into ground water, further reducing their effectiveness. Further, nitrates are toxic to humans when in ground water and may, in some areas be illegal for crop fertilization.

The most common technique for nitrogenation is through the application of anhydrous ammonia, a liquefied gas under pressure at ambient conditions. Liquid ammonia, $NH_3$, under pressure of approximately 125-150 p.s.i., is fed into a plowed furrow in a field. The plow precedes the liquid ammonia feed tube and, as it is fed into the ground in liquid form, the plowed furrow is closed, covering the liquid ammonia. In essence, the liquid ammonia is injected into the soil at about 6 to 9 inches below the soil surface.

As the liquid ammonia hits the soil, the moisture in the soil will immediately freeze because the vaporization of the liquid ammonia is endothermic. Thus, the ammonia gas is forced upwardly through the loose soil rather than penetrating into the surrounding frozen soil. Depending upon the character of the soil and its water content, virtually all of the ammonia gas can escape upwardly, leaving very little remaining in the soil for plant fertilization.

Not only is the application of liquid ammonia into the soil as above described inefficient, but this procedure is also toxic to individuals performing this procedure.

Spent or sandy soils will not bind to ammonia and thus, plants in such soils cannot be fertilized by any mode of nitrogen application and, in general fertilization of such types of soil is extremely difficult.

The present invention utilizes liquid ammonia in a confined structure and method so that virtually all of the plant fertilization capabilities are fully utilized in increasing crop yields and at lower nitrogen cost. Further, beneficial irrigation effectiveness of the invention is markedly increased when first utilized with liquid ammonia to fertilize a field.

BRIEF SUMMARY OF THE INVENTION

This invention is directed to a fertilization and irrigation system including a hollow tubular fiber conduit having a liquid permeable wall for nitrogen fertilizing and irrigating soil. The conduit or length of this tubular material is placed within the soil generally in the vicinity of the root level of plants to be irrigated. For nitrogen fertilization, ammonium hydroxide ($NH_4OH$) is introduced into the conduit, the ammonia ($NH_3$) then permeating through the conduit wall into the soil. The presence of ammonium hydroxide may be by circulation or held statically under a varying amount of static head pressure. The ammonium hydroxide interacts to dissolve the plasticizer within the hollow fiber so that the plasticizer will thereafter go into colloidal suspension within water and carried away. By removal of plasticizer in this manner, both fertilization efficiency and the water permeability of the conduit for subsequent irrigation of the plants and soil are increased significantly.

It is therefore an object of this invention to provide a hollow fiber fertilization system for the delivery of ammonia ($NH_3$) through the permeable walls of the tubular hollow fiber material by the introduction of ammonium hydroxide within the hollow fiber conduit.

It is another object of this invention to provide an improved method of delivering nitrogen fertilizer into soil.

It is yet another object of this invention to provide an improved subterranean irrigation system for plants.

It is yet another object of this invention to provide a nitrogen fertilization system for plants which may additionally be used for irrigating those same plants.

In accordance with these and other objects which will become apparent hereinafter, the instant invention will now be described with reference to the accompanying drawings.

DETAILED DESCRIPTION OF THE INVENTION

Figure 1:
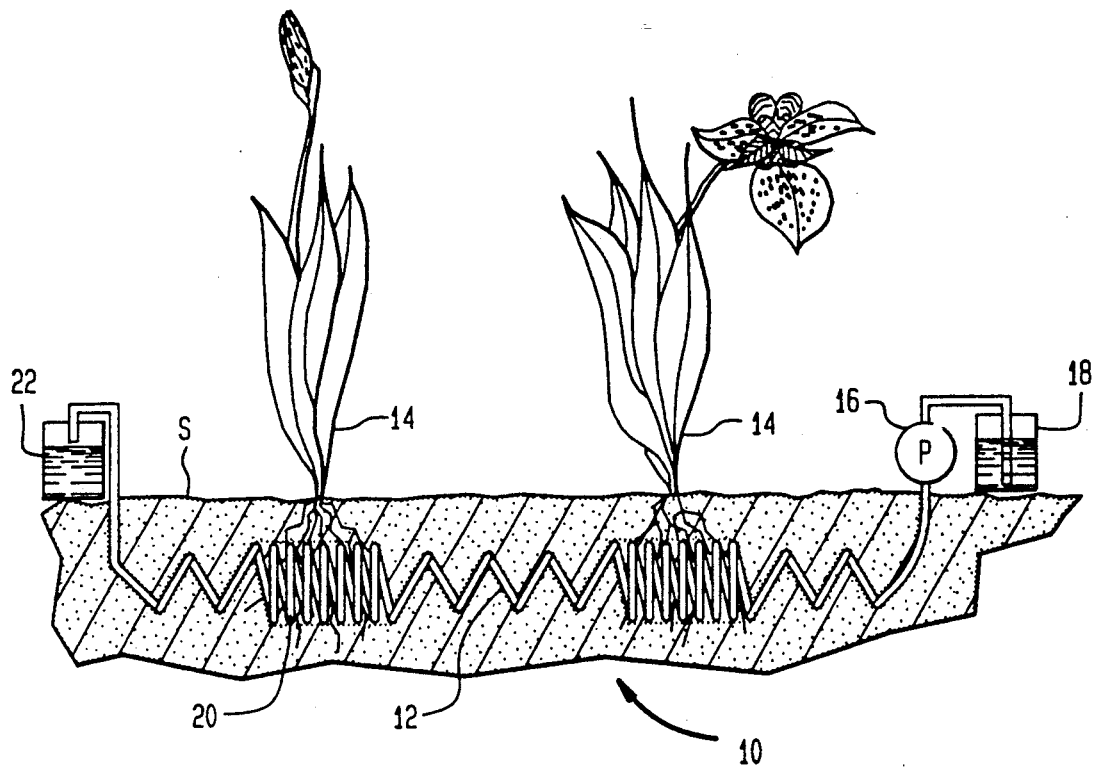
FIG. 1 is a side elevation schematic view of one embodiment of the invention.

Referring now to the drawings, one embodiment of the invention is shown in FIG. 1 at numeral 10 and includes a conduit 12 formed of a flexible, pliable, hollow fiber. The wall of the conduit 12 is formed of a semi-permeable material such as cellulose acetate so that ammonia ($NH_3$) and water will pass through the wall. The conduit 12 is shaped having a plurality of circular coils 20 of equal size and constant internal and external diameters and may be either collected or extended in accordion fashion as shown to vary the concentration of fertilization as beneath each plant 14 within the soil S.

To form the conduit 12, melted cellulose acetate mixed with a plasticizer, preferably DiButyl Phthalcite (Mallinckrodt), data boiling point of 340 degrees centigrade, molecular weight of 278.35, is forced through an orifice in the molten form. Injected into this orifice is nitrogen gas ($N_2$) to form an internal bubble in the molten thread. The thread is cooled and drawn to the desired diameter of the conduit. By controlling the amount of $N_2$ gas, the wall thickness of the conduit is controlled. Other plasticizers of similar molecular structure and weight with Hydroxyl (OH minus) solubility can be used in the conduit. See my previous U.S. Pat. No. 4,805,343 for a more complete discussion of the process for manufacturing cellulose acetate conduit.

A pump 16 supplies ammonium hydroxide ($NH_4OH$) from container 18 into conduit 12. The other end of conduit 12 is positioned to discharge into container 22. By this arrangement, ammonium hydroxide pumped from container 18 may be allowed to lay statically within conduit 12, during which time the ammonia ($NH_3$) will permeate through the wall of conduit 12 into the soil S. Thereafter, remaining water may be then pumped into container 22. Note that the height of the end of conduit 12 with respect to container 22 may be used to establish a static head pressure within conduit 12.

Concentration of ammonia has been in the ranges of 5-10%, 20%, 30%, 40-50% with a preferred amount being equivalent to about 180 lbs. $NH_3$/acre.

Figure 2:
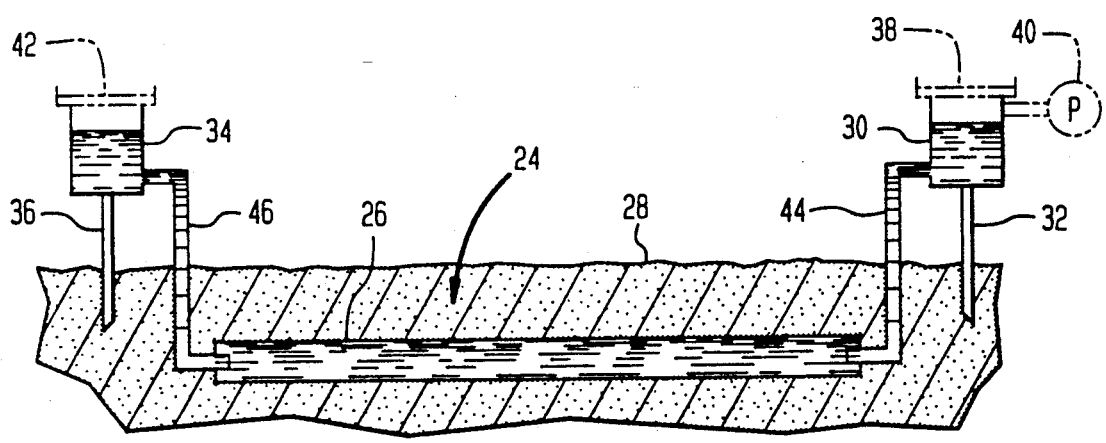
FIG. 2 is a side elevation schematic view of the preferred embodiment of the invention.

Referring now to FIG. 2, the preferred embodiment of the invention is there shown at numeral 24 and includes an elongated flexible, pliable, hollow fiber conduit 26 which is also formed of a semi-permeable material such as cellulose acetate so that both water and ammonia ($NH_3$) will pass through the wall of the conduit 26. The conduit 26 is buried beneath the surface of soil S and generally parallel thereto at a depth either at or slightly below the anticipated level of root systems or plants.

This system 24 also includes a container 30 filled with ammonium hydroxide ($NH_4$) which is interconnected by a length of silastic rubber tubing 44 leading into conduit 26. The container 30 is held stationary at a chosen elevation above the soil S by support shaft 32.

After the ammonium hydroxide has been allowed to sit within conduit 26 so that all of the ammonia ($NH_3$) has permeated through the wall into the soil S, the remaining water is removed through silastic rubber tubing 46 into discharge container 34, again held above the soil S by support stake 36. This pumping is accomplished by either increasing the static head pressure within container 30 by introducing additional ammonium hydroxide or by sealing the container 30 with a stopper 38 and then pressurizing the interior by pump 40, both shown in phantom. Should additional static pressure be desired within conduit 26, a stopper 42, in phantom, may serve to seal the opening of container 34 as well.

In general, the preferred size of these flexible tubular fiber conduits 12 and 26 are in the range of 0.060" dia. This size presents approximately 0.56 $cm^3$ per ft. of interior volume.

FIELD APPLICATION FOR FERTILIZATION

As an example of the application of this invention for fertilization, assume that presently approximately 180 lbs. of ammonia ($NH_3$) is used per acre for corn fertilization at a ten percent (10%) efficiency or 18 pounds per acre. This level of fertilization converts to 0.386 g. $NH_4OH$ per square foot.

By utilizing the above information, in conjunction with a 200 foot length of conduit having I.D. of 0.06", approximately two applications of ammonium hydroxide within this conduit would be required to achieve the equivalent ammonia ($NH_3$) concentration to that of the conventional topical fertilization.

IMPROVEMENT OF PERMEABILITY

In experimentation, it has been noted that the cellulose acetate hollow fiber material substantially increases in permeability of ammonia ($NH_3$) from the conduit during each fertilization cycle. Thus, between the first and second fertilization, the time required for complete dispersion of ammonia ($NH_3$) is reduced in half, a twofold gain in permeability. By the end of the fourth treatment, the permeability has improved by approximately 4.5 fold and, after eight such treatments, the permeability has improved approximately 5.2 fold.

It has also been observed that cloudiness of the remaining water within the conduit is present during these initial 8-10 treatment cycles. Thereafter, the cloudiness disappears and the remaining water is relatively clear. Upon further investigation, it has been determined that this cloudiness results from the dissolving of the plasticizer within the wall of the cellulose acetate fiber and that the remaining water within the conduit, or water introduced to flush the arrangement, allows the plasticizer to go into a colloidal suspension for disposal.

The removal of the plasticizer, it has been observed, appears to result in the above-described increased ammonia ($NH_3$) permeability through the wall of the conduit.

The time period for dissolving the plasticizer in relation to contact time period is based upon the number of cycles; e.g. 40% ammonia requires 5 to 8 cycles of 4 hours per cycle at a liquid temperature of 70 degrees fahrenheit.

Full dissipation of the ammonia from the conduit may be determined by the pH of absorbed gas by wetting pH (Litmus) paper with the liquid in the conduit. A blue color indicates the presence of $NH_3$ in the gas. Alternately, a pH meter as manufactured by Beckman, Model 72, may be used to determine the point at which liquid in the conduit no longer contains ammonia.

IMPROVED IRRIGATION PERFORMANCE

The basis arrangement shown in FIG. 1 has been utilized as disclosed in my previous U.S. Pat. No. 4,928,427 for irrigation. However, the above dissolution and removal of the plasticizer within the hollow cellulose acetate fiber conduit appears to have resulted in a substantially increased irrigation effectiveness of this system as well. In experimentation, after a total of seventeen (17) treatments of ammonium hydroxide ($NH_4OH$) through the conduit, the water permeability of the wall has also increased approximately twenty eight fold. The increase in permeability appears to increase at an approximate linear rate up to a point where all plasticizer has been dissolved and removed. Thereafter, the permeability rate for water remains relatively unchanged.

It is also noted that this plasticizer removal results in a substantial decrease in the overall dimensional integrity of the conduit such that any undue pressure within the conduit may result in either bulging or rupturing of the conduit itself. Therefore, only minimal static pressure within the conduit after extended use can be tolerated and should be carefully controlled, perhaps in the range of only a few inches of static head pressure as in the container arrangement 18/22 in FIG. 1 and 30/34 in FIG. 2.

BUBBLE FORMATION

As ammonium hydroxide ($NH_4OH$) releases ammonia ($NH_3$) for diffusion through the wall of each conduit, the volume of liquid will be reduced to that of water. This results in a void being created within the conduit. If both ends of the conduit are open to air, voids may occur anywhere along the length of the conduit. These bubbles then create a relatively high back pressure to liquid or air flow. To remove them from the conduit requires additional pressure within the conduit which, as previously described, may lead to either bulging or rupture. Thus, avoiding bubbles within the conduit is quite important.

There are three methods for avoiding these air bubble formations. (1) The preferred embodiment is to maintain a slight liquid head pressure at each end of the conduit as shown in both embodiments in FIGS. 1 and 2. (2) One alternate method of avoiding bubbles is to maintain a liquid head pressure at only one end of the conduit so as to move the liquid within the conduit toward the other open end. (3) A third method of avoiding bubbles is simply to seal one end of the conduit, leaving the other end open for fluid and air movement.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A method of irrigating soil below the soil surface comprising the steps of:
    A. placing a conduit formed of a length of flexible, pliable hollow tubular fiber in the soil with an axis of said conduit substantially parallel to the soil surface; said fiber having water permeable properties;
    B. introducing ammonia hydroxide into said conduit for a period of time sufficient to dissolve at least a portion of a plasticizer within said fiber, said period of time also being sufficient to dissipate ammonia gas from said ammonium hydroxide from within said conduit into the soil leaving substantially only water within said conduit;
    C. flushing said conduit with water to form a colloid of said dissolved plasticizer for removal;
    D. introducing additional water into said conduit thereafter.

2. A method as set forth in Claim 1, further comprising the steps of:
    repeating steps B and C at least once prior to step D.

3. A method of irrigating soil by which an underground conduit formed of a length of flexible, pliable, hollow tubular fiber and positioned in the soil with an axis of said conduit is substantially parallel to the soil surface, comprising the steps of:
    A. introducing ammonia hydroxide into said conduit to dissolve at least a portion of a plasticizer within said fiber;
    B. flushing said conduit with additional water to form a colloid of said dissolved plasticizer for removal;
    C. introducing additional water into said conduit thereafter.

4. A method of irrigating soil by which an underground conduit formed of a length of flexible, pliable, hollow tubular fiber and positioned in the soil with an axis of said conduit is substantially parallel to the soil surface, comprising the steps of:
    A. introducing ammonia hydroxide into said conduit for a period of time sufficient to dissolve at least a portion of a plasticizer within said fiber, said period of time also being sufficient to dissipate ammonia gas from said ammonium hydroxide from within said conduit into the soil leaving substantially only water within said conduit;
    B. flushing said conduit with additional water to form a colloid of said dissolved plasticizer for removal;
    C. introducing additional water into said conduit thereafter.

5. A method of increasing the water permeable properties of an underground conduit formed of a length of flexible, pliable hollow tubular fiber and positioned in the soil comprising the steps of:
    A. filling said conduit with ammonia hydroxide and allowing all ammonia gas to dissipate from said conduit into the soil until only water remains within said conduit;
    B. flushing said conduit with fresh water to remove dissolved plasticizer from said conduit;
    C. repeating step A.

* * * * *